June 18, 1974   R. W. MEYER   3,817,802
ULTRASONIC SEWING

Filed June 21, 1971   6 Sheets-Sheet 1

INVENTOR.
ROBERT W. MEYER

BY
Leonard W. Suroff
ATTORNEY

INVENTOR.
ROBERT W. MEYER

BY
Leonard W. Auroff
ATTORNEY

June 18, 1974  R. W. MEYER  3,817,802
ULTRASONIC SEWING
Filed June 21, 1971  6 Sheets-Sheet 3
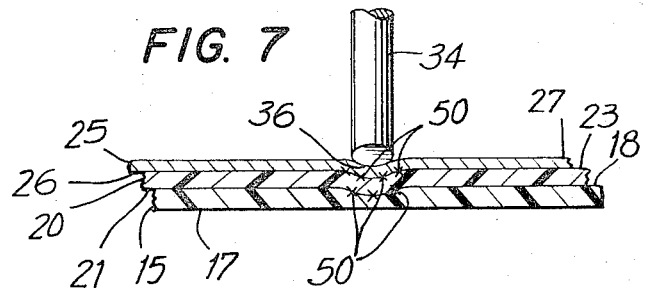
FIG. 7
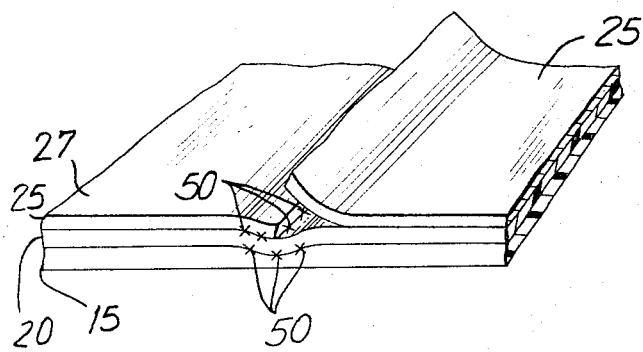
FIG. 8
FIG. 9
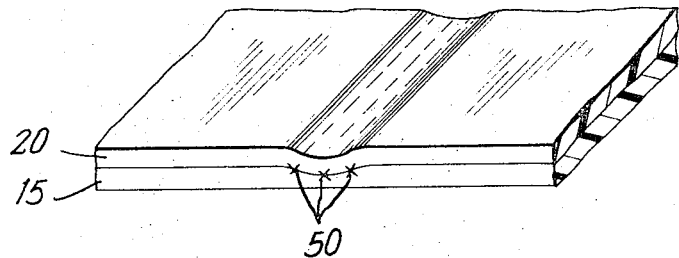
FIG. 10
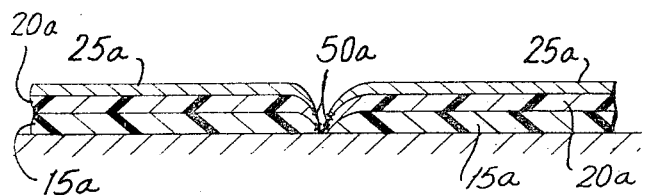
INVENTOR.
ROBET W. MEYER
BY
Leonard W. Suroff
ATTORNEY

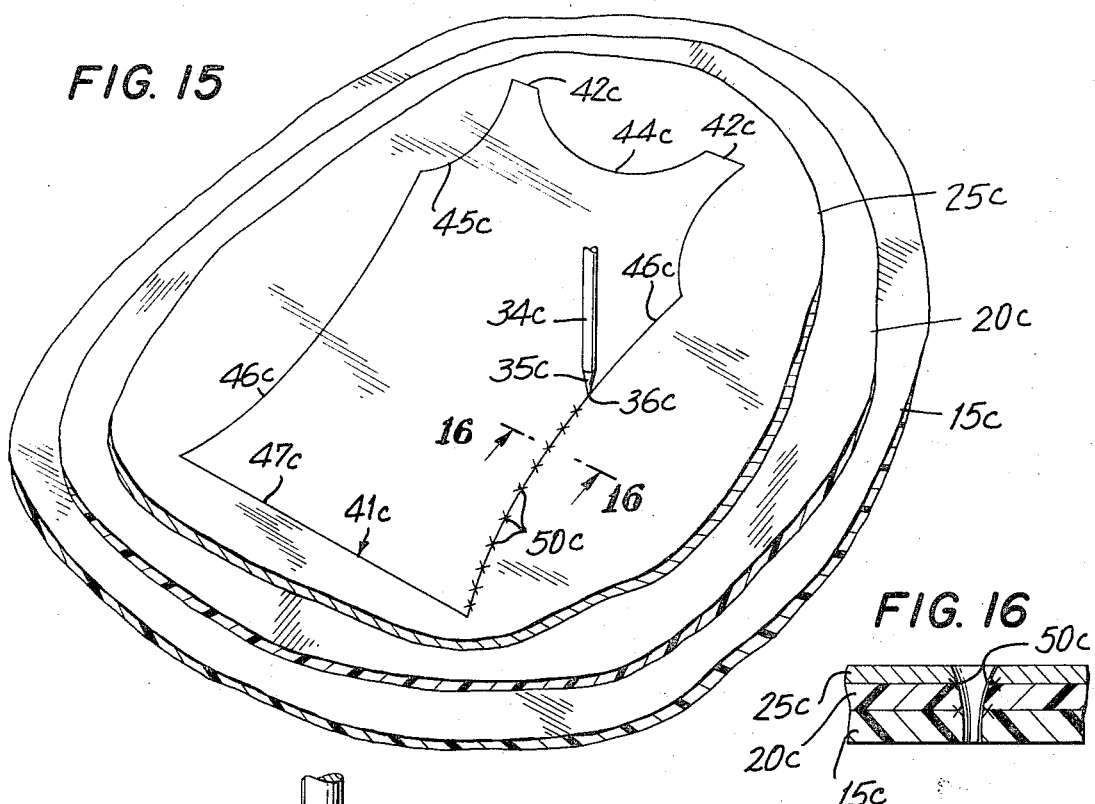
FIG. 15
FIG. 16
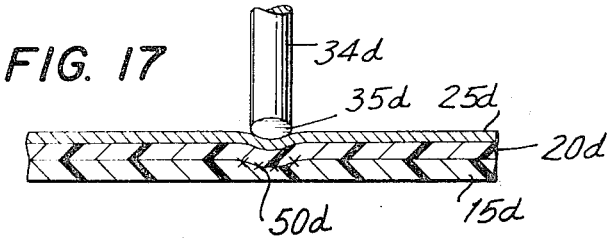
FIG. 17
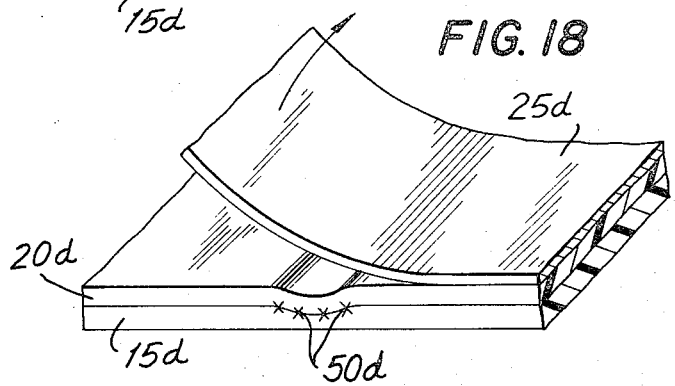
FIG. 18
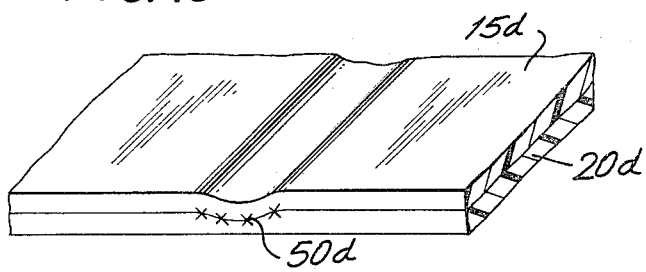
FIG. 19
INVENTOR.
ROBERT W. MEYER June 18, 1974     R. W. MEYER     3,817,802
ULTRASONIC SEWING Filed June 21, 1971     6 Sheets-Sheet 6

INVENTOR.
ROBERT W. MEYER

BY
Leonard W. Aunoff
ATTORNEY

United States Patent Office 3,817,802
Patented June 18, 1974

3,817,802
ULTRASONIC SEWING
Robert W. Meyer, Huntington Station, N.Y., assignor to Ultrasonic Systems, Inc., Farmingdale, N.Y.
Filed June 21, 1971, Ser. No. 154,755
Int. Cl. A41d 27/00; B32b 31/00, 31/16
U.S. Cl. 156—73                         29 Claims

ABSTRACT OF THE DISCLOSURE

This invention relates to the fabrication of articles from generally thermoplastic sheet material using ultrasonic energy and other procedures such that a pattern of the shape that the article is to take is initially welded with the welding of the two or more sheets comprising the article and the sheets do not have to be first cut to the shape of the article to be formed. The pattern is then removed at its welded joint with the sheets. If desired the pattern and sheets of material are simultaneously cut and welded with the pattern thereafter removed, kits and their method of assembly are also disclosed.

BACKGROUND OF THE INVENTION

The present invention relates to a novel ultrasonic method and apparatus for sewing together thermoplastic materials, and for sewing them in a selected pattern, and kits therefor.

In the field of fabricating certain articles or items of use, such as wearing apparel, drapes, slip covers, etc., the use of synthetic fabrics or materials that are of a thermoplastic material, i.e. capable of being ultrasonically bonded, has come into wide use. In order to utilize these materials for home consumer and other use there are many instances in which a specific pattern is desired to be formed from fabrics. Prior to this invention the person using a sewing machine would first have to cut the fabric along the line of the pattern such that the time consuming function of cutting material would take place as part of each assembly procedure.

Applicant has now discovered that materials of thermoplastic nature can now be ultrasonically fabricated into a particular item without the need of first cutting the material along the outline of the pattern.

OBJECTS OF THE INVENTION

An object of the invention is to provide novel methods and apparatus for the continuous joining of materials.

Another object of the invention is to provide novel methods and appaartus for the continuous joining of materials in a defined pattern.

Another object of the invention is to provide novel methods and apparatus for the continuous joining of materials in a defined pattern and simultaneously cutting through the pattern and overlapped sheets of material.

Another object of the invention is to provide a novel method for ultrasonically sewing materials together.

Another object of the present invention relates to a method that will seal and cut thin thermoplastic materials on a continuous operating basis at speeds such as those that are suitable for sewing machine applications and in a defined pattern.

Another object of the present invention is to provide an improved method and means for sealing and cutting thin thermoplastic materials on a continuous operating basis at suitable speeds of a defined pattern for manufacturing of products.

Other objects and advantages will become obvious as the disclosure proceeds.

SUMMARY OF THE INVENTION

The outstanding and unexpected results obtained by the practice of the method and apparatus of this invention are obtained by a series of features, steps and elements assembled and working together in interrelated combination. Briefly, I have now discovered that it is possible to produce a permanent joint between two or more sheets, after the sheets are assembled in contact with each other, i.e. in overlapping or abutting relationship, and a pattern sheet is placed on one of the two sheets. The position of the desired joint is along the outline on the pattern and is formed with a welding tip placed in contact with one exposed surface of the assembly, which may be the pattern sheet, and the anvil surface is placed in contact with the diametrically opposite exposed surface of the assembly, at the position of the desired joint, and preferably the distance between the welding tip and the anvil is reduced until the thickness of the assembly at the position of the joint is less than the normal thickness of the assembly whilst ultrasonic oscillations are supplied to the welding tip until a joint between the sheets to be permanently joined is formed and the pattern sheet. Preferably, during the passage of the ultrasonic oscillations, the distance between the welding tip and the anvil is decreased until the thickness of the assembly at the position of the desired joint is decreased by about half. In some instances, a stronger joint may be obtained by maintaining pressure at the position of the joint for a short time after the oscillations have been stopped.

Once the seal is formed the pattern sheet is then torn off and removed leaving the permanent seal in place to be used. In addition the sheets being joined including the pattern sheet may be simultaneously cut and sealed.

The frequency and amplitude of the oscillations of the welding tip and the time of treatment should be such that a joint of optimum strength is obtained. For a fixed frequency the time of treatment required to produce a strong joint generally decreases as the amplitude is increased. The frequency of the oscillations is usually from 5 to 100 kilocycles per second and is preferably about 20 to 40 kilocycles per second.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof wherein like reference numerals refer to like parts throughout the several views and in which:

FIG. 7 is a partial view taken along line 5—5 of FIG. 3 illustrating the joining obtained;

FIGS. 8 and 9 are views similar to FIG. 7 illustrating the removal of the sheet containing the pattern thereon and the resultant seam;

FIGS. 10 and 11 are similar to FIGS. 7 and 8, but illustrate the invention when a simultaneous sealing and cutting of the sheets are obtained and the subsequent removal of the sheet containing the pattern thereon;

FIG. 15 is a view similar to FIG. 3 illustrating the ultrasonic sewing process;

FIG. 16 is a partial view taken along line 16—16 of FIG. 15 illustrating the joining obtained;

FIGS. 17, 18 and 19 are similar to FIGS. 7-9, except that the upper sheet is not sewn to the underlying sheet;

PREFERRED EMBODIMENTS OF THE INVENTION

Figure 1:
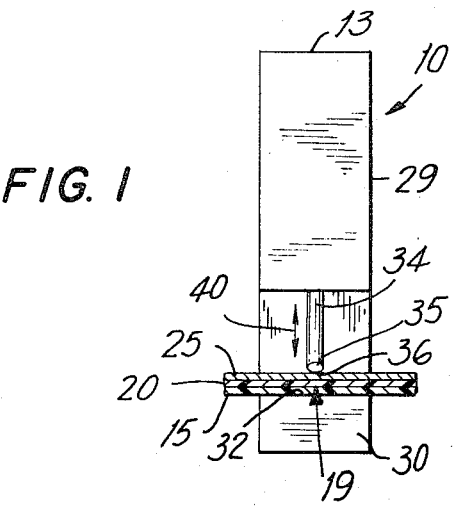
FIG. 1 is a side elevational view of the joining apparatus embodying the invention.
Figure 2:
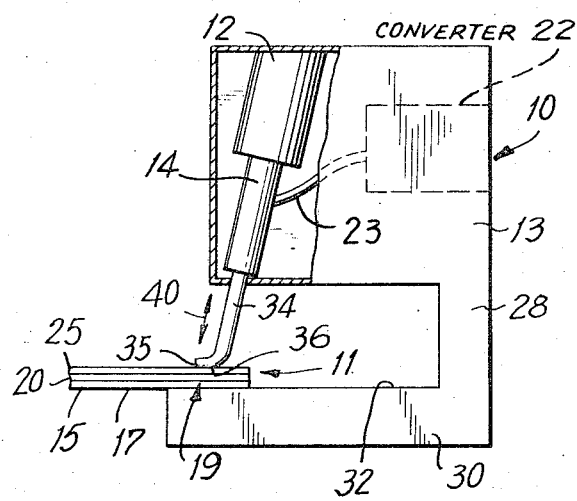
FIG. 2 is a front elevational view, partly broken away and in section, of the joining apparatus of FIG. 1.
Figure 3:
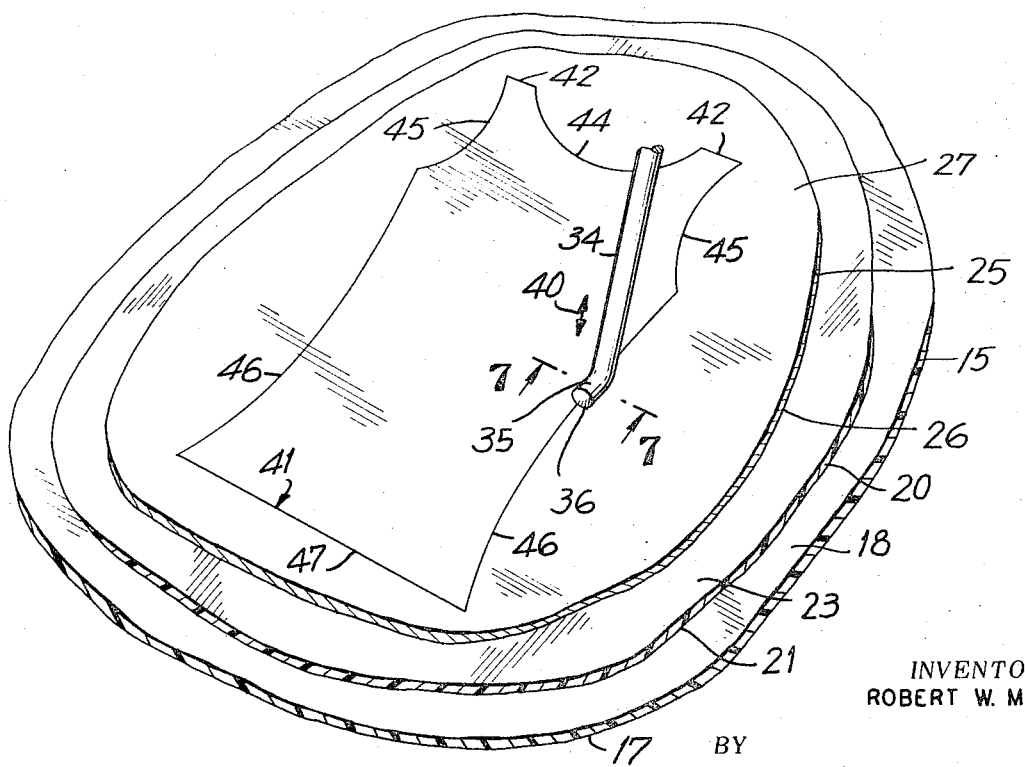
FIG. 3 is an enlarged fragmentary view, partly broken away and in section illustrating the ultrasonic sewing with a pattern.

Referring now to FIGS. 1, 2 and 3, there is illustrated therein apparatus according to the invention for joining or sealing sheet materials. As indicated by the cross hatching in the figures, the materials illustrated to be permanently joined are of plastics, but it will be realized that the sheets to be joined may be of any thermoplastic materials including woven fabrics or materials capable of coalescing to form a bond therebetween. It will also be understood, that only one of the materials need be of this character, the other sheet, for example, being of a thermo-softening material into which the fusible material will penetrate. However, for the purpose of the explanation of the figures to follow, it will be assumed that the apparatus is working with plastic sheet materials.

The basic structure for joining sheet material, generally identified by the reference numeral 10, comprises a reciprocating mechanism 12 such as the one found in conventional sewing machines, mounted on a supporting structure 13 and ultrasonic transducer means in the form of an ultrasonic motor or vibrator 14 mounted in substantial longitudinal alignment with a portion of the reciprocating mechanism 12 by conventional assembly means. This arrangement forms a joining or sealing station 11 which receives overlapped sheets of materials 15, 20, and 25, hereinafter sometimes referred to as the first, second and third sheets respectively, to pass therebetween and joined by the combined action of the vibratory forces applied therethrough.

As seen in FIGS. 1 and 2 the ultrasonic motor 14 is mounted within a housing 29 enclosing the supporting structure 13 such that the exposed portion of the motor is in the form of a tool member or welding tip 34 that may have a variety of output ends 35, as in the form of a shoe with a contacting edge 36 having a finite cross-sectional area to form a weld between the assembled sheets. The high frequency transducer means 14 may be either in the sonic or ultrasonic frequency range but for purposes of the present invention the word "ultrasonic" will be used to denote vibrations in the range of approximately 5,000 to 1,000,000 cycles per second.

The ultrasonic motor 14 may be one of a variety of electromechanical types, such as electrodynamic, piezoelectric and magnetostrictive. The ultrasonic motor for effecting welding procedures of suitable configuration may have tips which are readily replaceable or inter-changeable with other work performing tools in acoustically vibrated material treating devices, and wherein each work tool member is rigidly joined, in end-to-end relationship to a connecting body may form an insert unit or assembly.

The transducer in the ultrasonic motor 14 is preferably longitudinally dimensioned so as to have lengths which are whole multiples of half-wavelengths of the compressional waves established therein that longitudinal loops of motion as indicated by arrow 40, occur at the tool output end 36. Thus, the optimum amplitude of longitudinal vibration and hyper-accelerations of the member 34 is achieved, and such amplitude is determined by the relationship of the masses of the tool member 34 which may be made effective to either magnify or reduce the amplitude of the vibrations received from the transducer.

The supporting structure 13 consists of neck 28 joined to a support means 30 having a work top support surface 32 extending horizontally. The layers of thermoplastic material 15 and 20 having overlapping portions which comprise an area of overlap 19, along which the sheets are joined as they are supported on work surface 32 of the support means 30 and fed past the joining station 11. Although the ultrasonic motor is seen mounted above the sheets to be joined it may also be mounted below the sheets. Also the pattern sheet 25 may be mounted such that it is not in contact with the output tool or member 34 of the ultrasonic motor but on the bottom of the assembly comprised of sheets 15, 20 and 25. Obviously more than two sheets may be permanently joined.

The sheets 16 and 20 are progressively moved between the opposing members as vibratory forces are simultaneously applied along a common line which extends through the reciprocating mechanism 12 and the ultrasonic vibrator 14. The frequency of the reciprocating mechanism is of conventional speed. The reciprocating mechanism 12 is provided but its function will depend on the particular "stitch" being formed. For example if a continuous weld is formed then the reciprocating mechanism 12 is retracted to permit the overlapped sheets to be brought into the sealing station 11 and then the mechanism 12 is brought down to apply a static force against the overlapped sheets at which time the power may be turned on and the converter or generator 22 which is connected by cable 23 to the motor 14 energized. The ultrasonic vibrator 14 is substantially in continuous engagement with the thermoplastic sheets since its amplitude of vibration is generally in the range of .0001 to .010 of an inch as compared to the amplitude of the reciprocating mechanism 12 which may be in the order of .032 to .100 of an inch so that a true physical separation occurs between the sheets and the force applying vibrator. It is generally during this separation of the pressure applying member of the reciprocating mechanism and the sheets that the latter will be advanced for repetitive joining in similar fashion as that of a sewing machine.

The low sonic vibratory forces engage the overlapped surface during a portion of the low frequency cycle to compress the materials sufficiently to permit the coupling of the high frequency vibratory enregy thereto, and said forces may be applied by a variety of force applying means for example, a jet of compressed air, a pulsating expandable bellows or a conventional sewing machine mechanism which is readily adaptable to various speeds of oscillation.

The reciprocating mechanism 12 is capable of applying the requisite static forces to the overlapped surface to sufficiently compress them together to permit the proper coupling between the overlapped portions with the ultrasonic vibrator 14.

As stated hereinbefore, the sheets 15, 20 and 25 are joined by assembling them in contact with each other, i.e. in overlapping or abutting relationship, at the position of the desired joining and applying ultrasonic oscillations to the assembly at this position. Preferably, the thickness of the assembly of sheets at the position of the desired joint when the oscillations are applied is less than normal thickness of the assembly and more preferably the thickness of the assembly at the position of the desired joint during application of the oscillations is about half the normal thickness of the assembly. The ultrasonic oscillations are supplied by any suitable known ultrasonic motor 14 and converter 22 that comprises a source of ultrasonic oscillations connected to a welding tip 34, means for altering the amplitude of the oscillations of the welding tip 34, an anvil or work surface 32 positioned directly facing the welding tip 34, said anvil 32 acting as a support for the sheets of material when a joint between the sheets is being produced, and means for adjusting the distance between the welding tip 34 and the anvil 32. The oscillations of the welding tip 32 are usually supplied by a magnetostrictive or piezoelectric transduced. The amplitude of the oscillations of the welding 34 depends on the wattage power supplied. The welding tip and anvil may have various shapes such as needle, shoe, rods, rings, discs, sheets, or combinations of these shapes. In producing a line joint between two or more sheets by the method of this invention, both the welding tip and the anvil may be in desired forms.

FIG. 3 illustrates the actual procedure of ultrasonically sewing together the first sheet 15 and second sheet 20 of synthetic materials, which may be of a woven design or nature as generally is the case with fabrics having a third sheet 25 with a pattern 41 contained thereon. The assembly of sheets is such that 16 has its lower surface on the support surface 32 and its upper surface 18 in engagement with the lower surface 21 of sheet 20 and in turn the lower surface 26 of sheet 25 is in contact with sheet 20. The outline of the pattern 41 is illustrated to be in the form of a dress. For purposes of discussion it will be noted that the pattern of the dress has top sections 42 a neck section 44 joined therebetween arm section 45 connected at one end to the top sections 42 and at its opposite end to the side sections 46 which are joined together by a bottom section 47. Obviously, the design may be such that the entire pattern may be worked on at one instant or may be rather large design such that sections of a particular pattern are pieced together as by being placed in end-to-end relation for making of particular items of wearing apparel or other goods.

When the sheets are in overlapping relationship as seen in FIGS. 1 and 2 and as illustrated in FIG. 3, they are moved relative to the vibratory tool member 34 at a preselected speed such that the toe 35 having its contacting edge 36 engage the lines on the pattern 41 such that a continuous or intermittent weld is formed between the pattern sheet 25 and sheets 15 and 20 as the assemblage of said sheets is moved relative to the ultrasonically vibrating contacting edge 35, which vibrations are indicated by the arrow 40. As the assembly of sheets is moved relative to the edge 36, a bond or weld is formed between the pattern sheet 25 and sheets 15 and 20, as for example on pattern lines 42 and 46. In those areas 44, 45 and 47 of the pattern 41 in which no weld is desired to be formed, then the user avoids having the ultrasonic energy introduced along said lines and this may be done by merely turning off the energy or be removing the assemblage sheets or by welding away from the pattern line that is desired to be welded such that the next procedure as illustrated in FIG. 4 can be accomplished.

Figure 4:
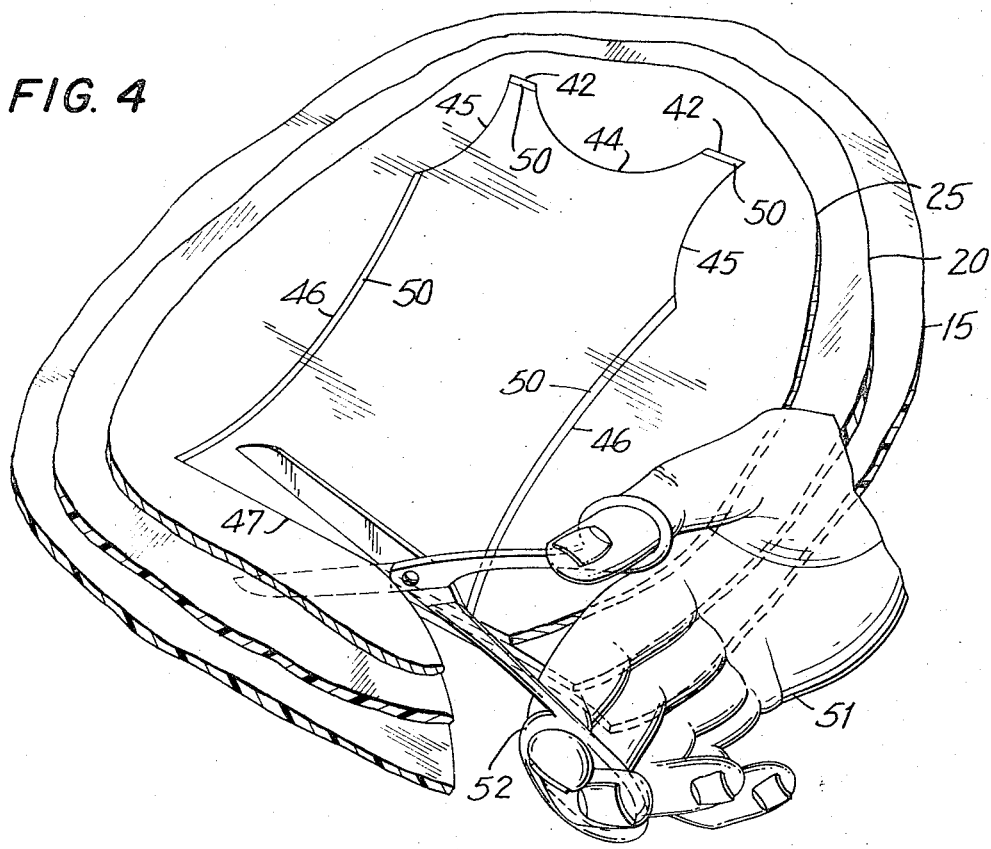
FIG. 4 is an enlarged fragmentary view, partly broken away and in section illustrating the cutting of the sheets after welding the selected portions thereof.

As seen in FIG. 4, welded joints 50 have been formed in those areas of the pattern in which it is desired to join them together. In those areas where no weld is desired as in the neck section 44, sleeve section 45, and bottom section 47, of the dress, the user 51 may thereafter manually cut by a scissor 52, or other means, the overlapped sections of material such that the final completion of the garment may be accomplished by thereafter hemming over the material either by sewing it in a conventional manner or preferably hemming it by ultrasonic means such that the entire garment can be ultrasonically produced. In the production of a garment such as the dress herein illustrated, the materials generally are overlapped in reverse to each other such that after the welding is formed, they are reversed so that proper side of the material is shown.

Figure 5:
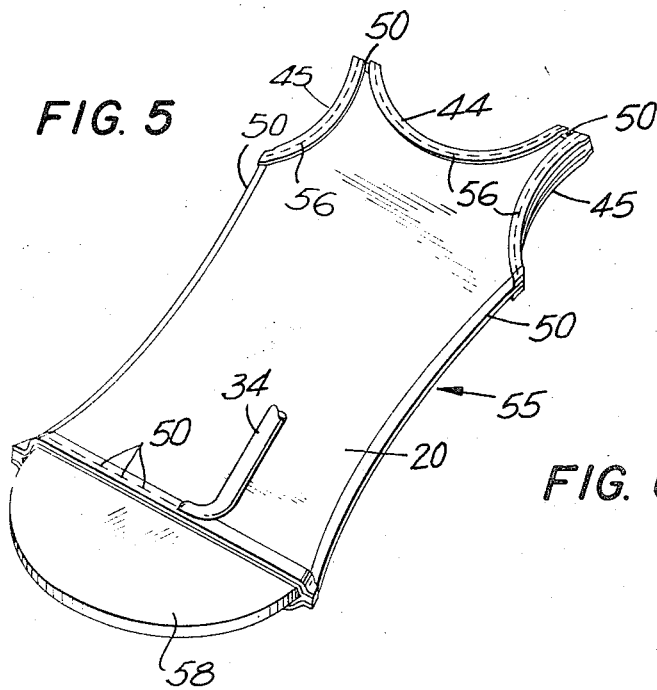
FIG. 5 is a view similar to FIG. 3 illustrating the hemming of certain portions of the item manufactured.
Figure 6:
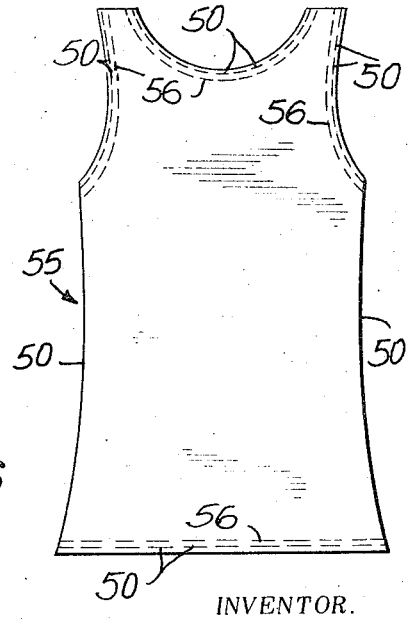
FIG. 6 is a front view of a finished article assembled in accordance with the invention.

FIG. 5 illustrates the hemming of the bottom of the article 55 by ultrasonic means and FIG. 6 illustrates the finished article. Once the initial sections of the article are joined together as in FIG. 3 and the excess material removed as in FIG. 4 the final hemming or other sealing may be accomplished as illustrated in FIG. 5. When the sheets are cut a band 56 of sufficient width of sheet 20 is left remaining and folded over itself. This can be done after the pattern sheet is removed completely, or just in the section being worked upon, the tool member 34 is brought into engagement with the sheets to form intermittent welds 50 to hem over the band of material 56. This operation may also be done on a continuous basis if desired, this is accomplished by adjustment in the equipment 10 as to the rate of oscillation of the reciprocating mechanism 12 if so desired. This same procedure as illustrated at the side section may be performed at the neck section 44 and arm section 45, and may be performed whenever it is desired not to have a welded section in order that the overlapped sheets are not welded to each other. In the hemming procedure a support plate 58 may be interposed between the overlapping section and removed subsequent to the welding procedure.

As seen in FIG. 6 ultrasonically assembled item 55 has spaced apart welded side portions and hemmed over portions 56 with welds 50 thereon. As seen the overlapped portions 56 are on the inside of the item 55 since it was inverted after the procedure was accomplished in FIG. 5.

FIGS. 7, 8 and 9 illustrate one form of the invention in which the sheets 15, 20 and 25 are welded together in that the weld 50 is formed and there is in cutting through of the materials.

Figure 11:
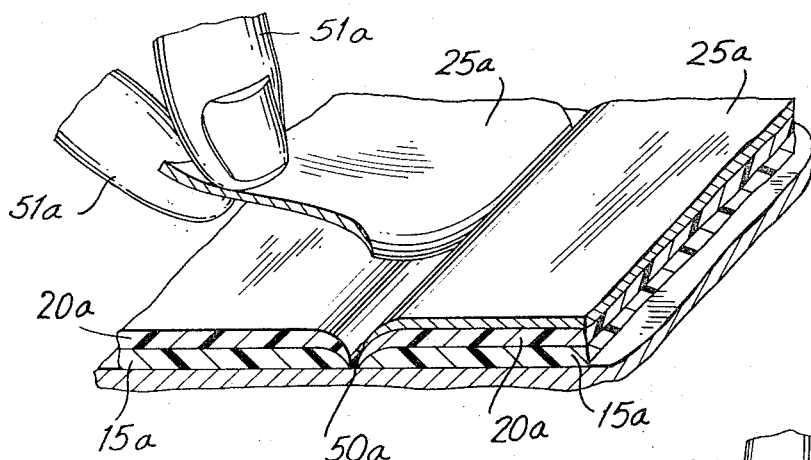

Accordingly, the welding procedure may be controlled by the design of the vibratory member 34, the amount of pressure applied to the materials or the power input or amplitude of vibration, to obtain the weld as seen in FIGS. 7–9, or as illustrated in FIGS. 10 and 11 in which a simultaneous weld and cutting or shearing of the materials is accomplished. In each instance, though, the weld between the pattern sheet 25, which is generally of a tissue type paper material or other material, does not form a permanent type weld to a thermoplastic sheet such that after the weld is formed the pattern sheet 25 may be manually raised from or torn off at the welded point 50 such that as seen in FIG. 9 a welded joint or seam 50 is provided with the pattern sheet 25 having been removed such that the two fabrics are permanently welded together without any visible sign that they were initially joined with a pattern sheet which sheet has subsequently been removed. Accordingly in the sewing process shown in FIGS. 1–3 the sheet 25 is temporarily joined to the second sheet 20 and the latter is joined to sheet 15. The welded joint 50 as seen in FIG. 9 is compressed and is less than the normal thickness of the sheets 15 and 20.

FIGS. 10 and 11 illustrate the embodiment of the invention wherein the sheets 15a and 20a are on a support surface and with the overlapping pattern sheet 25a contained thereon and as the welding process took place a simultaneous cutting of the three sheets also took place such that two distinct welds 50a are formed at opposite sides of the pattern line which was contained on the sheet 25a. It has been found in some instances that, although a first sweep along the pattern line takes place, it is sometimes desirable to go over a second time to assure that a complete severing of both sides of the pattern line of all three sheets has taken place. As seen in FIG. 11 the user 51a thereafter may tear off with his fingers the pattern sheet 25a from each side of the weld 50a such that the pattern sheet is completely removed from the welded sheets 15a and 20a and the item may then be completed in a manner similar to that described in FIGS. 4 and 5. In the same manner as described with respect to FIG. 6, the material may then be reversed such that the weld formed is contained on the inside of the fabric sheets.

Figure 12:
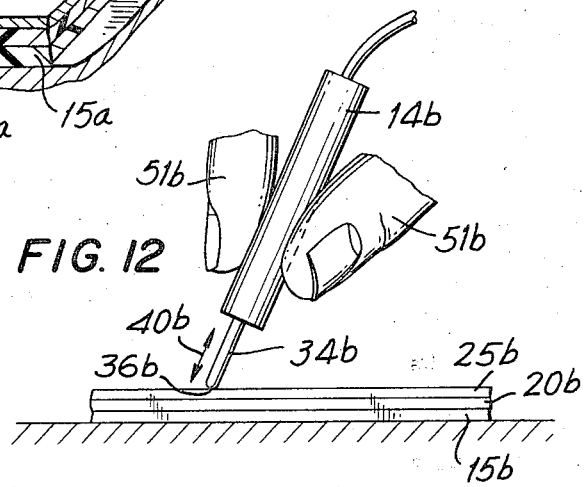
FIG. 12 is a side view illustrating the sealing of sheets as described above with a hand held unit.

FIG. 12 illustrates the assembly procedures as illustrated in FIGS. 3 through 11 but with the utilization of a hand-held ultrasonic motor 14b connected by cable 23b to the converter, and held by the fingers of the user 51b such that the contact edge 36b of the tool 34b is vibrated at an ultrasonic rate as indicated by the arrow 40b with the sheets 15b, 20b and 25b being joined together. The procedure for assembling sheets as seen in FIG. 12 may be useful by adults for their conventional sewing applications, as well as by use for children in ultrasonic hobby kits and where it is desired to make dolls' clothing or even infants' clothing by children to accomplish the results of a sewing machine as illustrated in FIGS. 1 and 2. Accordingly the entire sewing or fabricating assembly procedure may be carried out manually as in FIG. 12 or on a sewing machine device as in FIGS. 1 and 2 or FIGS. 13 and 14, or both.

A textile fabric having a coating of a thermoplastic composition may be joined for example, the fabric may be obtained by weaving yarns of the desired count or denier, or by forming textile fibers into a felt in which the fibers are arranged at random and then coating the fabric with a thermoplastic material. Other materials which can be obtained in the form of fibers or filaments, that have a thermoplastic coating thereon can also be joined in accordance with the present invention.

Figure 13:
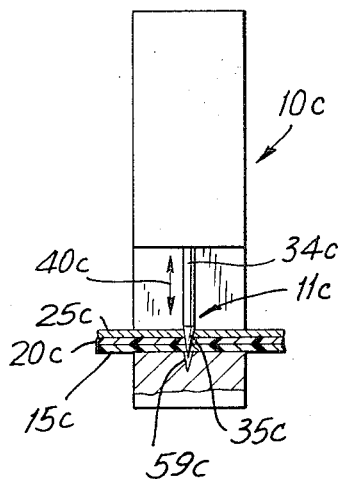
FIGS. 13 and 14 are similar to FIGS. 1 and 2 respectively except that a needle point tool is illustrated.
Figure 14:
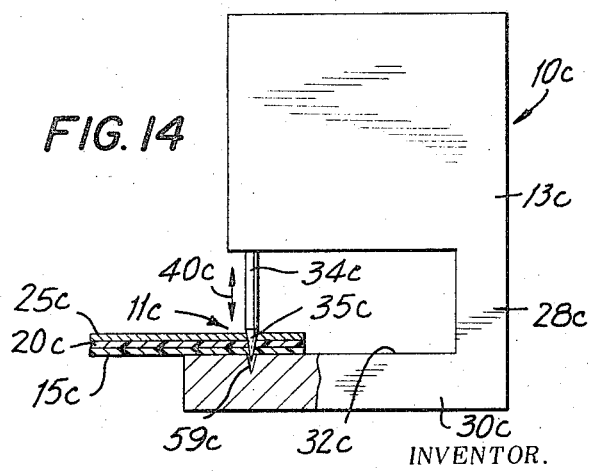

Referring to FIGS. 13 and 14, there is illustrated therein apparatus 10c according to the invention for joining or sealing sheet materials using a tool member 34c having conical tip 35c that may be sharp pointed or not.

The basic structure for sewing sheet material, generally identified by the reference numeral 10c is similar to that indicated in FIGS. 1 and 2, with the reciprocating mechanism mounted on a supporting structure 13c and ultrasonic transducer means in the form of an ultrasonic motor or vibrator mounted in substantial longitudinal alignment with a portion of the reciprocating mechanism by conventional assembly means. This arrangement forms a joining or sealing station 11c which receives overlapped sheets of materials 15c, 20c, and 25c, to pass therebetween and joined by the combined action of the vibratory forces applied therethrough. The exposed portion of the motor is in the form of a tool member or welding tip 34c that may have a variety of output portions 35c, terminating in an output tip 36c that is herein illustrated like a needle to pierce the materials and weld them together.

The supporting structure 13c consists of neck 28c joined to a support means 30c having a work top support surface 32c extending horizontally and having a seat 59c for the tip or edge 36c. The layers of thermoplastic material 15c and 20c having overlapping portions which comprise an area of overlap along which the sheets are joined as they are supported on work surface 32c of the support means 30c and fed past the joining station 11c. Although the ultrasonic motor is seen mounted above the sheets to be joined it may also be mounted below the sheets. Also the pattern sheet 25c may be mounted such that it is not in contact with the output tool or member 34c of the ultrasonic motor but on the bottom of the assembly comprised of sheets 15c, 20c and 25c.

The sheets 16c and 20c are progressively moved as the reciprocating mechanism is controlled to obtain a series of spaced apart welds 50c as seen in FIG. 15. The frequency of the reciprocating mechanism 12 will depend on the particular "stitch" being formed. Since we want spaced apart welds the reciprocating mechanism is retracted to permit the overlapped sheets to be brought into the sealing station 11 and then the mechanism is brought down to apply a static force against the overlapped sheets at which time the power may be turned on from the converter.

FIG. 15 illustrates the actual procedure of ultrasonically sewing together the first sheet 15c and second sheet 20c of synthetic materials, which may be of a woven design or nature as generally is the case with fabrics, having a third sheet 25c with a pattern 41c contained thereon and using a needle like member 34c. The assembly of sheets is such that 15c has its lower surface on the support surface 32c and its upper surface in engagement with the lower surface of sheet 20c and in turn the lower surface of sheet 25c is in contact with sheet 20c. The outline of the pattern 41c is illustrated to be in the form of a dress. For purposes of discussion it will be noted that the pattern of the dress has top sections 42c a neck section 44c joined therebetween arm sections 45c connected at one end to the top sections 42c and at its opposite end to the side sections 46c which are joined together by a bottom section 47c. Obviously, the design may be such that the entire pattern may be worked on at one instant or may be of rather large design such that sections of a particular pattern are pieced together as by being placed in end-to-end relation for making of particular items of wearing apparel or other goods.

When the sheets are in overlapping relationship as seen in FIGS. 13 and 14 and as illustrated in FIG. 15, they are moved relative to the vibratory tool member 34c at a preselected speed such that the tip 35c having its contacting edge 36c engage the lines on the pattern 41c such that an intermittent weld 50c as seen in FIG. 16 is formed between the pattern sheet 25c and sheets 15c and 20c as the assemblage of said sheets is moved relative to the ultrasonically vibrating contacting edge 30c, which vibrations are indicated by the arrow 40c. As the assembly of sheets is moved relative to the edge 36c, a bond or weld is formed between the pattern sheet 25c and sheets 15c and 20c as for example on pattern lines 42c and 46c. In those areas 44c, 45c and 47c of the pattern 41c in which no weld is desired to be formed, then the user avoids having the ultrasonic energy introduced along said lines and this may be done by merely turning off the energy or be removing the assemblage sheets or by welding away from the pattern line that is desired to be welded. The output edge of the tool member can be blunt since the dynamic forces generated by the high accelerations of the tool member pierce the sheets of material.

Another important aspect of the invention is illustrated with respect to FIGS. 17, 18 and 19, which is the ability to join together two or more sheets of thermoplastic material 15d and 20d with the aid or use of a third sheet 25d such that at the completion of the sewing procedure a weld 50d is established between sheets 15d and 20d and either no weld is established between sheet 25d and 20d or one in which the sheet 25d may be torn from its bonded relationship as illustrated in FIGS. 7 and 8. This method of joining sheets together using a third sheet is most suited when joining woven fabrics together that have a weave and, by the movement of the ultrasonic tool relative to one of the sheets itself, under certain circumstances, a "plowing" effect occurs such that the weld produced can either be unsightly or an insecure bond is formed. For example, in sealing together polyethylene sheet material, it has been found that the use of wax-coated paper can act as the third sheet such that the polyethylene sheet materials are welded together with no resultant weld between the third sheet 25d and the underlying sheet 20d. Accordingly, the third sheet might or might not have a pattern thereon such that the user may merely sew together two sheets in any random manner as he or she so desires by merely forming the assembly and using the apparatus as seen in FIGS. 1 and 2 or in FIGS. 12, 13 and 14. Accordingly, the relationship, of the materials being joined, the material selected for the third sheet, frequency and amplitude of vibration, will determine whether or not a weld is formed between sheets 25d and 20d. These variables are easily controllable and selected.

Figure 20:
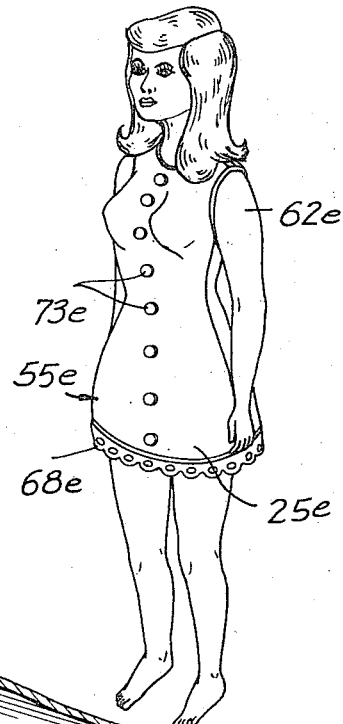
FIG. 20 illustrates a doll having clothing thereon made in accordance with the present invention.
Figure 21:
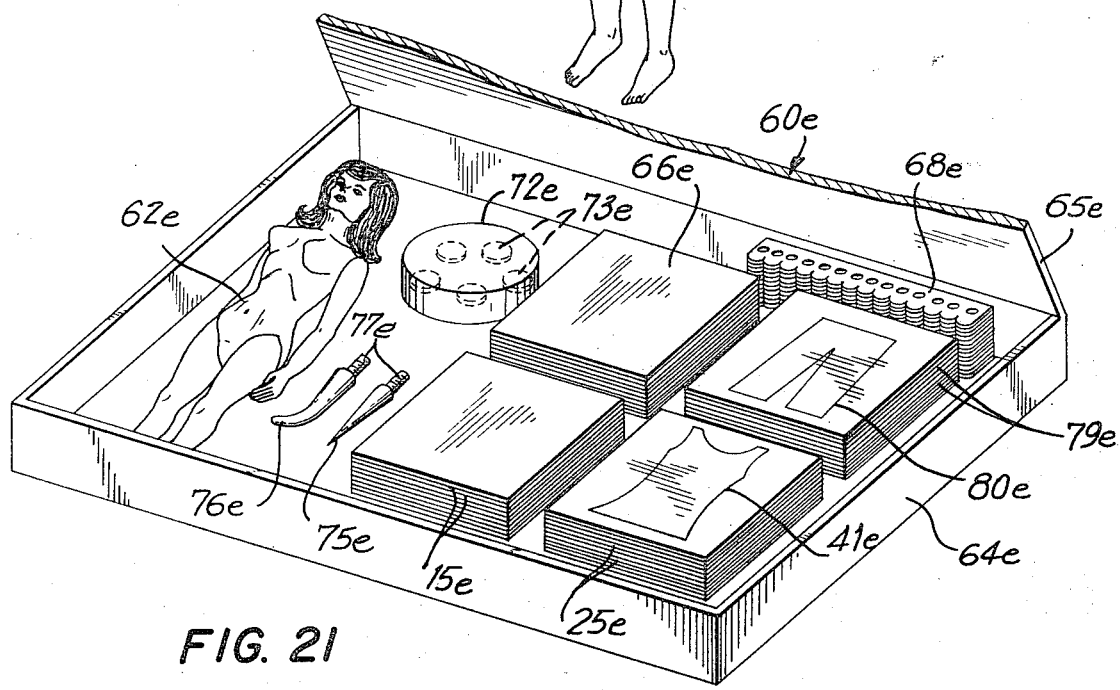
FIG. 21 illustrates a kit having various components for ultrasonic sewing.

FIGS. 20 and 21 illustrate an aspect of the invention in which the necessary components to form an article 55e is provided in a kit 60e having a cover 65e and containing therein a plurality of components. The article 55e is illustrated as a dress for a doll 62e, but obviously the size of the material provided may be of a size to make clothing or other items for adults or of any other size. The kit 60e may include a number of individual pieces of sheet material 15e that may be ultrasonically joined together by ultrasonic means using a pattern sheet 25e having a pattern 41e thereon in the form of a dress 55e which is seen assembled in FIG. 20 on the doll 66e which is of a material that will not be bonded to the underlying sheets as discussed with respect to FIGS. 17–19, inclusive. A trim material 68e is supplied that is joined to the bottom of the dress 55e in the manner described herein. A second grouping of pattern sheets 79e may also be provided having a different pattern thereon.

The kit 60e may also include a container 72e containing a number of buttons 73e or other fasteners that may be secured to the material from which the dress is made.

The kit 60e may also include one or more welding tips of a metallic material and adapted to be removably secured to an ultrasonic motor. As seen a needle type pin 75e having a rear threaded section 77e is provided and a bent tip 76e having a rear threaded section 77e is provided. The shape and size of the tip will vary with the type of stitch to be performed. Obviously the sheet materials may be supplied in sheet roll, and may be of a woven fabric material.

CONCLUSION

Accordingly, what has been herein illustrated is an entire procedure in which, either on a commercial production basis or for home use, people may assemble wearing apparel or other items that are to be manufactured from thermoplastic sheet material which may be of a woven type as generally found in garments or of an extruded sheet, or formed in some other manner. Although the invention has been illustrated with respect to wearing apparel, it is obvious to state that both industrial, medical, and home consumer products may be manufactured using the invention described herein. The use of plastic sheet materials has grown over the years and is intended to continue too grow such that the present invention will find application in all the fields of industrial and consumer fronts. Although the invention has been described being referenced to sheet material, it is appreciated that a sheet may be joined to a rigid body utilizing a pattern in those instances where materials of different thickness are to be joined together and the invention is not limited to the welding of sheets alone or materials of the same thickness.

Accordingly, what is described herein is a complete process by which an item of manufacture may be made using ultrasonic energy, or portions thereof, combined with other skills in the assembly of materials field, as well as kits therefor.

I claim:

1. A method of sewing together thermoplastic sheets of material comprising the steps of
    (a) overlapping a first and second thermoplastic sheet of material in contact with each other,
    (b) positioning over said sheets a third sheet of material, capable of transmitting therethrough ultrasonically varying forces,
    (c) supporting said overlapping sheets of material on a surface, said third sheet being of a material that does not bond to said first and second thermoplastic sheets,
    (d) generating ultrasonically varying forces in a member having a finite area,
    (e) moving said three sheets to be joined and said forces relative to each other to apply said ultrasonically varying forces across the surface of said third sheet, and
    (f) removing said third sheet from its relationship with said sheets of material, whereby the application of said ultrasonic forces seals said first and second sheets to each other.

2. The method according to claim 1, wherein said third sheet has a pattern contained thereon and said sheets may be sewn together by following said pattern.

3. The method according to claim 1, wherein said third sheet is of a non-thermoplastic material and the bond formed between said thermoplastic sheet is substantially stronger than the bond formed with said third sheet so that the latter is easily removed therefrom.

4. The method according to claim 1, wherein said third sheet is made of paper.

5. The method according to claim 1, wherein said third sheet is of a paper material having a wax coating thereon.

6. The method according to claim 1, wherein said sheets are moved relative to said member.

7. The method according to claim 1, wherein said member is moved relative to said overlapped sheets.

8. The method according to claim 1, wherein said ultrasonic vibration has a component substantially normal to the surface of said overlapped sheets.

9. The method according to claim 1, and further including the step of simultaneously cutting said sheets as said forces are applied.

10. The method according to claim 1, wherein said seal is continuous.

11. The method according to claim 1, wherein said seal is intermittent.

12. The method according to claim 1, and further including the step of oscillating said member to form said seal between said sheets.

13. The method according to claim 1, and further including the steps of
    (a) cutting said thermoplastic sheets in the area that were not welded to form a hemming portion,
    (b) folding said hemming portion over said sheet, and
    (c) ultrasonically welding said hemming portion to said sheet.

14. The method according to claim 13, and further including the step of reversing the materials to have a completed article.

15. The method according to claim 1, wherein said article is in the form of wearing apparel.

16. The method of fabricating an article of thermoplastic sheets of material according to a pattern, comprising the steps of
    (a) overlapping a first and second thermoplastic sheet of material in contact with each other,
    (b) positioning over said sheets a third sheet of material having a pattern thereon,
    (c) supporting said overlapping sheets of material on a surface,
    (d) generating ultrasonically varying forces in a member having a finite area,
    (e) moving said three sheets to be joined and said forces along said pattern relative to each other with said third sheet in engagement with said member to apply said forces across the surface of said sheets with a component of vibration substantially normal to the surfaces of said overlapped sheets whereby the application of said ultrasonic forces seals said first and second sheets to each other in accordance with said pattern,
    (f) simultaneously bonding said third sheet to the sheet it is in engagement with, wherein the bond formed between said thermoplastic sheets is substantially stronger than the bond formed with said pattern sheet so that the latter is easily removed therefrom, and
    (g) removing the pattern sheet from its relationship with said sheets of material, whereby said sheets are joined together in the pattern contained on said pattern sheet.

17. The method according to claim 16 wherein said pattern sheet is of a non-thermoplastic material.

18. The method according to claim 16, wherein said pattern sheet is made of paper.

19. The method according to claim 18, wherein said pattern sheet is coated with a wax layer on the side it engages the abutting sheet.

20. The method according to claim 16, wherein said member is moved relative to said overlapped sheets.

21. The method according to claim 16, and further including the steps of
(a) cutting said thermoplastic sheets in the area of said pattern that were not welded to form a hemming portion,
(b) folding said hemming portion over said sheet at approximately the pattern line,
(c) ultrasonically welding said hemming portion to said sheet.

22. The method according to claim 16, and further including the step of simultaneously cutting said sheets along said pattern as said forces are applied.

23. The method according to claim 16, and further including the step of oscillating said member to form said seal between said sheets.

24. The article formed by the method of claim 16.

25. A method of fabricating an article of thermoplastic sheets of material according to a pattern, comprising the steps of
(a) overlapping a first and second thermoplastic sheet of material in contact with each other,
(b) positioning over said sheets a third sheet of material having a pattern thereon,
(c) supporting said overlapping sheets of material on a surface,
(d) generating ultrasonically varying forces in a member having a finite area,
(e) moving said three sheets to be joined and said forces along said pattern relative to each other with said third sheet in engagement with said member to apply said forces across the surface of said sheets with a component of vibration substantially normal to the surfaces of said overlapped sheets whereby the application of said ultrasonic forces seals said first, second, and third sheets to each other in accordance with said pattern,
(f) cutting said thermoplastic sheets in the area of said pattern that were not welded to form a hemming portion,
(g) folding said hemming portion over said sheet at approximately the pattern line,
(h) ultrasonically welding said hemming portion to said sheet,
(i) removing the pattern sheet from its bonded relationship with said sheets of material, whereby said sheets are joined together in the pattern contained on said pattern sheet, said pattern sheet is of a non-thermoplastic material and the bond formed between said thermoplastic sheets is substantially stronger than the bond formed with said pattern sheet so that the latter is easily removed therefrom, and
(j) reversing the materials to have a completed article.

26. The method according to claim 25, wherein said article is in the form of wearing apparel.

27. The method according to claim 25, and further including the step of simultaneously cutting said sheets along said pattern as said forces are applied.

28. The method according to claim 25, wherein said seal is continuous.

29. The method according to claim 25, wherein said seal is intermittent.

References Cited

UNITED STATES PATENTS

| | | | |
|---|---|---|---|
| 3,657,033 | 4/1972 | Sager | 156—73 |
| 1,642,964 | 9/1927 | Mather | 2—243 R |
| 327,961 | 10/1885 | Moschowitz | 2—243 B |
| 2,307,424 | 1/1943 | Savage | 156—73 |
| 2,411,328 | 11/1946 | MacNab | 2—243 B |
| 2,893,013 | 7/1969 | Miller | 2—243 R |
| 2,986,390 | 5/1961 | Kelly | 2—243 R |
| 3,022,814 | 2/1962 | Bodine | 156—73 |

DOUGLAS J. DRUMMOND, Primary Examiner

U.S. Cl. X.R.

2—243 R, 243 B; 156—289, 290